United States Patent [19]
Terada et al.

[11] 4,304,439
[45] Dec. 8, 1981

[54] HEAD REST ADJUSTING DEVICE

[75] Inventors: Takami Terada; Yasuhiro Kamijima, both of Toyota, Japan

[73] Assignees: Aisin Seiki Kabushiki Kaisha, Kariya; Toyota Jidosha Kogyo Kabushiki Kaisha, Toyota, both of Japan

[21] Appl. No.: 23,168

[22] Filed: Mar. 23, 1979

[30] Foreign Application Priority Data

Mar. 24, 1978 [JP] Japan .................................. 53-34594

[51] Int. Cl.³ .............................................. A47C 7/36
[52] U.S. Cl. .................................. 297/409; 297/391; 297/408; 297/410
[58] Field of Search ........ 297/391, 397, 399, 406–409, 297/61, 383

[56] References Cited

U.S. PATENT DOCUMENTS

| | | | |
|---|---|---|---|
| 1,686,631 | 10/1928 | May .................................. | 297/409 X |
| 2,434,007 | 1/1948 | O'Dea .............................. | 297/409 X |
| 2,767,778 | 10/1956 | Kriger et al. ...................... | 297/383 |
| 2,952,303 | 9/1960 | Spound et al. ..................... | 297/61 |
| 3,029,107 | 4/1962 | Myers ............................... | 297/399 |
| 3,055,707 | 9/1962 | Spound ............................. | 297/41 |
| 3,065,029 | 11/1962 | Spound et al. ..................... | 297/61 |
| 3,140,117 | 7/1964 | Fletcher ............................. | 297/61 |
| 3,159,427 | 12/1964 | Lawson ............................. | 297/410 |
| 3,328,082 | 6/1967 | Lilleso .............................. | 297/397 X |
| 3,337,268 | 8/1967 | Belk ................................. | 297/397 X |
| 3,387,886 | 6/1968 | Longo et al. ........................ | 297/397 |
| 3,403,983 | 10/1968 | Cramer et al. ...................... | 297/391 |
| 3,477,761 | 11/1969 | Krantz .............................. | 297/409 |

FOREIGN PATENT DOCUMENTS 6602887 9/1966 Netherlands ......................... 297/408

*Primary Examiner*—James T. McCall
*Attorney, Agent, or Firm*—Finnegan, Henderson, Farabow, Garrett & Dunner

[57] ABSTRACT

A device for forwardly and rearwardly adjusting the position of a safety headrest or pillow relative to the backrest of a vehicle seat, the headrest including a base member supported on the backrest and a frame member pivotally provided on the base member and covered by an outer cover for receiving and protecting the seat-occupant's head from shock to the vehicle. The device includes linkage pivotally interconnected between the base and frame member for permitting a link motion of the frame member relative to the base member in the forward and rearward directions, and a mechanism operable between the frame and base members for positioning and locking the frame member in a desired position on the path of the link motion thereof relative to the base member.

10 Claims, 7 Drawing Figures

HEAD REST ADJUSTING DEVICE

BACKGROUND OF THE INVENTION

This invention relates to a device for forwardly and rearwardly adjusting the position of a safety headrest or pillow provided above a backrest of a vehicle seat for protecting a passenger's or driver's head from a shock to the vehicle.

Means have been proposed for upwardly and downwardly adjusting the position of the headrest relative to the backrest of a vehicle seat by varying the position of engagement of a stay supporting the headrest with retaining means provided on the backrest. Means have also been proposed for adjusting the angular position of the headrest relative to the backrest about a horizontal axis provided on the central portion of the headrest. With these arrangements, however, it is impossible to adjust the forward or rearward position of the headrest relative to the backrest of the seat.

Usually when a passenger or driver sits in the seat, his physical features and posture cause a variation in the distance between his head and the headrest of the vehicle seat. If there is any space between the head and the pre-set headrest, there will be a risk that the head is not protected effectively by the headrest when the passenger or driver experiences a shock. It is also usual that when the passenger sits in the seat with the backrest in its reclined position, he feels a sense of security by supporting his head on the headrest retained in a position vertically higher than the passenger's body. Therefore, a vehicle seat is required which is provided with a safety headrest which can be adjusted in the forward and rearward directions relative to the backrest of the seat.

SUMMARY OF THE INVENTION

The object of the present invention is to satisfy such requirements

According to the present invention, a device is provided for forwardly and rearwardly adjusting the position of a safety headrest or pillow relative to a backrest of a vehicle seat, said headrest including a base member supported on said backrest and a frame member pivotally provided on said base member and covered by an outer cover for receiving and protecting the seat-occupant's head from a shock caused to the vehicle. The device includes linkage pivotally interconnected between said base and frame member for permitting link motion of said frame member relative to said base member in the forward and rearward directions, and locking means operable between said frame and base members for locking the frame member in a desired position on the path of the link motion thereof relative to said base member.

DESCRIPTION OF THE PREFERRED EMBODIMENT

Figure 1:
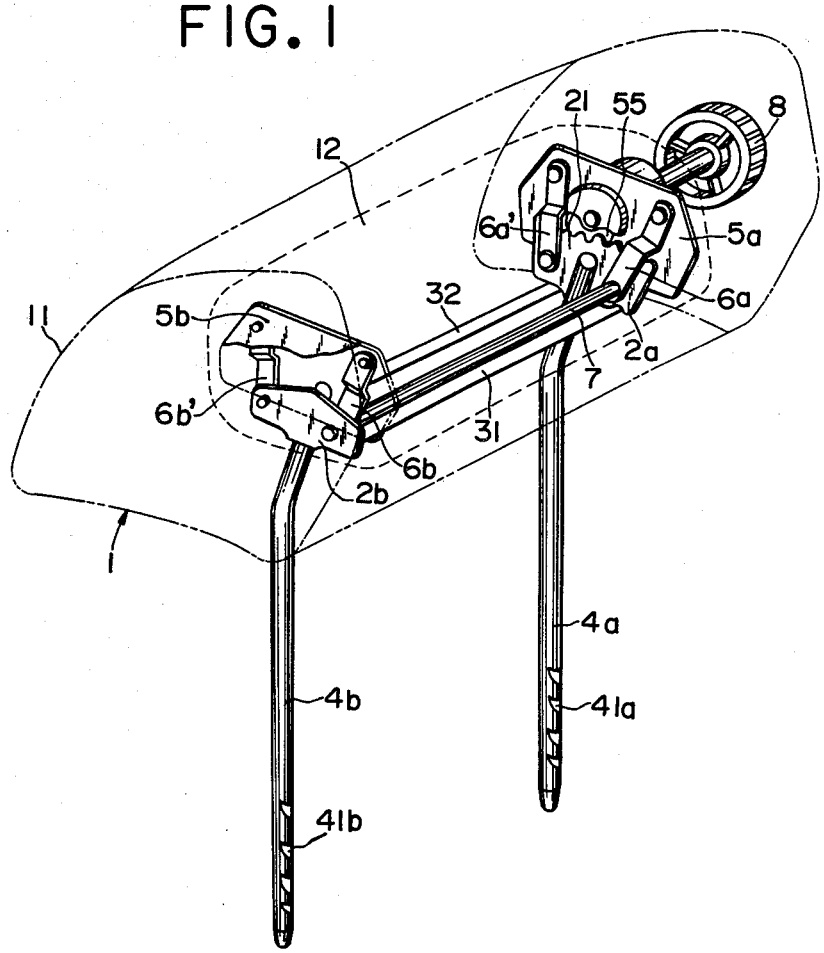
FIG. 1 is a perspective view, partly in phantom, of an example of a safety headrest incorporating an embodiment of a device according to the present invention for forwardly and rearwardly adjusting the position of the headrest relative to an associated backrest of a vehicle seat.
Figure 2:
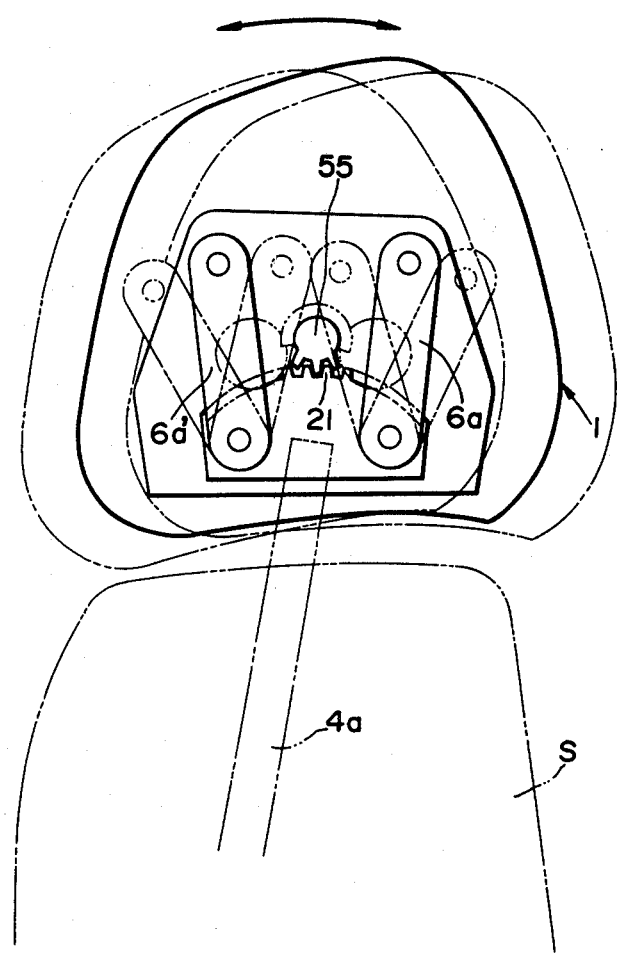
FIG. 2 is a side view of the device shown in FIG. 1.

Referring first to FIG. 1, a safety head rest 1 for a vehicle seat is provided with an outer cover 11 made of a suitable material, such as a synthetic resin, which encloses a cushioning material (not shown) made of, for example, a synthetic resin material. Formed within the headrest 1 is a cavity 12 which is provided at its opposite ends with a pair of base members 2a, 2b. The base members 2a, 2b are connected in an appropriately spaced relationship with each other by a pair of spacer rods 31, 32 and fixed by suitable means, such as welding, to upper ends of stays 4a, 4b, respectively. The stays 4a and 4b, are, in turn, extended from the spacer rods in substantially parallel relationship with each other and are formed at their lower portions with a plurality of notches 41a and 41b, respectively. The notches 41a and 41b are longitudinally spaced from but disposed in alignment with one another. In use, the stays are inserted into holes formed in a top end portion of a backrest S of the seat, as seen in FIG. 2. The backrest S is provided with suitable means engageable with selected notches 41a and 41b to retain the stays to the backrest, thereby vertically holding the headrest 1 in a desired position.

Figure 3:
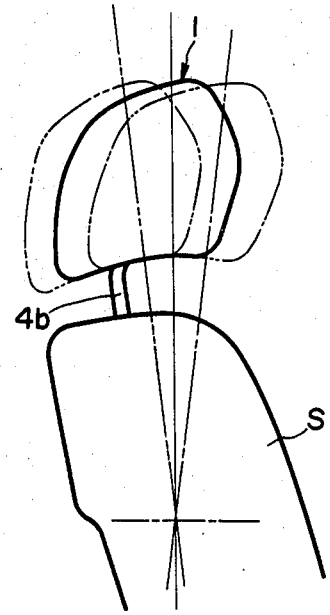
FIG. 3 is a side view of the headrest and backrest.

A pair of frame members 5a, 5b is fixed to the opposite end walls, respectively, of the cavity 12 of the headrest 1 and disposed adjacent to the respective base members 2a, 3b. The paired base and frame members 2a and 5a are pivotally connected to each other by a pair of spaced linking members 6a and 6a' and, similarly, the other paired base and frame members 2b and 5b are pivotally connected to each other by a further pair of spaced linking members 6b and 6b', the arrangement being such that the frame members 5a, 5b and thus the headrest 1 are forwardly and backwardly movable relative to the backrest S. It is desirable that the linking members 6a, 6b are in parallel disposition and diverge outwardly from the base members toward the respective frame members 5a, 5b as shown in FIG. 1. By utilizing links so positioned, the headrest 1 can be moved along the outer configuration of the top portion of the backrest S in substantially a horizontal path, as shown in FIG. 3. The linking members 6a and 6b are fixed at their lower ends to a torque rod 7 thereby permitting the linking member 6b to pivot together with the linking member 6a.

Figure 4:
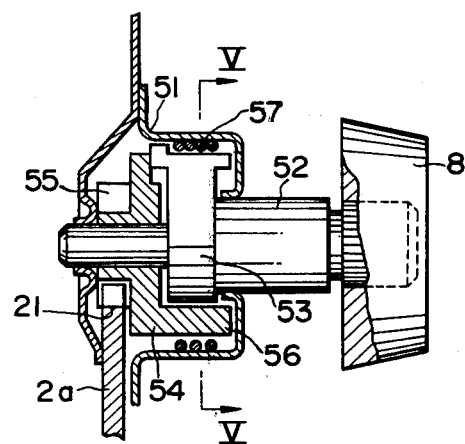
FIG. 4 is a sectional elevation of an example of the positioning and locking means provided in the device of FIG. 1.
Figure 5:
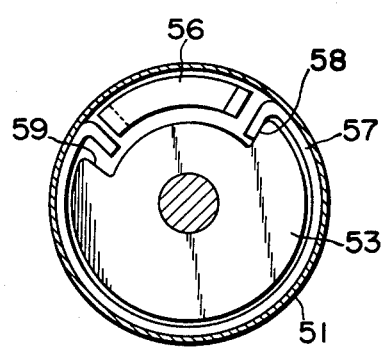
FIG. 5 is a section taken along a line V—V shown in FIG. 4.
Figure 6:
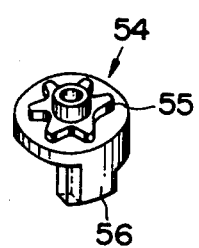
FIG. 6 is a perspective view of a part of the positioning and locking means shown in FIG. 4.

Provided between the base and frame members 2a and 5a are means for positioning and locking the headrest 1 relative to the backrest S. FIGS. 4-6 show an example of such means having a hollow cylindrical casing 51 fixed to the frame member 5a. The casing 51 axially and rotatably supports a shaft 52 which extends through the casing 51, the frame member 5a and the outer cover 11. An outer end of the shaft 52 is fixed to a knob 8 operable by the passenger or the driver. A partially cylindrical cam member 53 is fixed to the shaft 52 so as to be positioned within the casing 51 and spaced therefrom. The shaft 52 further supports a pinion member 54 which is rotatable upon shaft 52. The pinion member 54 is preferably made of a self-lubricating material and includes a pinion gear 55 which is in tooth-to-tooth engagement with a sector gear 21 formed on the base member 2a, and an integral part-cylindrical tooth portion 56 which extends into a cut-out portion of the member 53, as seen in FIG. 5. Disposed between the casing 51 and the member 53 and the portion 56 of the member 54 is a coiled spring 57 which is normally self-biased against the casing 51 and slightly spaced from the members 53 and 54. The opposite ends of the spring 57 are bent to extend into gaps defined between the member 53 and the portion 56 (FIG. 5).

With such arrangement, when the knob 8 is operated such that the shaft 52 is rotated in a counter-clockwise direction, as viewed in FIG. 5, an edge 58 of the member 53 urges an adjacent end of the spring 57 such that the spring 57 is contracted in diameter to disengage from the casing 51 and engage with the member 53 and the portion 56 of the member 54, thereby transmitting the rotational force from the member 53 through the spring 57 to the pinion member 54. Thus, the pinion 55 is forced to move along the sector gear 21 thereby allowing the link motion of the headrest 1 relative to the backrest S. When the operation of the knob 8 is ceased, the end of the spring 57 is not urged by the edge 58 of the member 53 so that the spring 57 is again expanded to engage the casing 51, thereby arresting the rotation of the members 53 and 54 to hold the headrest 1 in a desired position relative to the backrest S.

It will be appreciated that when the knob 8 is operated in the opposite direction the other end of the spring 57 is urged by an opposite edge 59 of the member 53 to cause similar movements of the parts to move the headrest 1 in the opposite direction.

Figure 7:
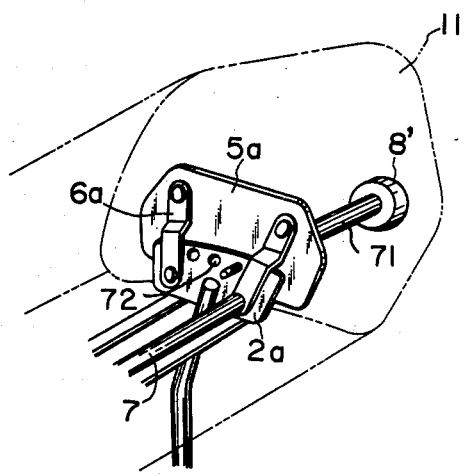
FIG. 7 is a perspective view of an alternative example of the locking means of the present invention.

An alternative example of the means for positioning and arresting the headrest 1 is shown in FIG. 7 wherein an axially movable shaft 71 extends through the frame member 5a and the outer cover 11 of the headrest 1, the shaft being provided at its outer end with a knob 8' and engaged at its inner end with one of several spaced holes 72 formed in the base member 2a. When the headrest 1 is held in another desired position, the shaft 71 is outwardly pulled to disengage the inner end thereof from the hole and then the headrest 1 is moved to the desired position and the shaft 71 is inwardly urged so that its inner end is engaged with a selected hole 72 to hold the headrest 1 in that position.

With the arrangement described heretofore, the device according to the present invention is advantageous in that the forward and rearward position of the headrest relative to the backrest can easily be adjusted by operating the knob in accordance with the physical features and position of the seat-occupant, so that his back and head can be in close contact with the back and headrests of the seat to create in him a sense of security and comfort as well as to protect his body and head from a shock to the vehicle.

It should furthermore be noted that the present invention is not limited to the preferred embodiment described above and any modification and alteration can easily be made by one skilled in the art without deviating from the scope of the present invention.

What is claimed is:

1. A device for forwardly and rearwardly adjusting the position of a headrest of a seat relative to the backrest of the seat comprising:

a base member supported on said backrest, a frame member covered by an outer cover for receiving and protecting a person's head, linkage means, pivotably connected to said base member and said frame member at fixed positions, for providing forward and rearward movement of said frame member relative to said base member along a substantially horizontal path, said linkage means including a first link and a second link, each link being pivotably connected at its opposite ends about parallel axes to said base and frame members, said first link canting outwardly from said base member to said frame member in one direction and said second link canting outwardly from said base member to said frame member in an opposite direction, and means for locking said frame member at selected positions relative to said base member.

2. The device of claim 1 wherein said locking means includes a knob interconnected with said base and frame member and projecting outwardly of said outer cover.

3. The device of claim 1 further comprising means for selectively imparting the forward and rearward movement of said frame member relative to said base member along said substantially horizontal path.

4. The device of claim 1 wherein said locking means comprises:

a plurality of spaced apertures in said base member, an aperture in said frame member alignable with said spaced apertures, and a shaft selectively engageable with said aperture in said base member and one of said spaced apertures.

5. A device for forwardly and rearwardly adjusting the position of a headrest of a seat relative to the backrest of the seat comprising:

a base member, means for supporting said base member in a plurality or vertical positions on said seat, a frame member covered by an outer cover for receiving and protecting a person's head, linkage means, pivotably connected to said base member and said frame member at fixed positions, for providing forward and rearward movement of said frame member relative to said base member along a substantially horizontal path, said linkage means including a first and a second link, each link being pivotably connected at its opposite ends about parallel axes to said base and frame members, said first link canting outwardly from said base member to said frame member in one direction and said second link canting outwardly from said base member to said frame in an opposite direction, and means for imparting the forward and rearward movement of said frame member relative to said base member along said substantially horizontal path for locking said frame member at selected positions relative to said base member.

6. The device of claim 5 wherein said imparting and locking means comprises:

a shaft rotatably connected to said frame member and extending through said outer cover, a cam member fixed to said shaft and having a cut out portion in its outer periphery, a pinion member, rotatably connected to said shaft, said pinion member having a tooth positioned within said cut out portion of said cam member and engageable with said cam member and further including a pinion gear, and a sector gear fixed on said base member and engaged with said pinion gear, whereby the rotation of said shaft and said cam member causes the pinion gear to move along the sector gear, thereby moving the frame member relative to the base member.

7. A device for forwardly and rearwardly adjusting the position of a headrest of a seat relative to the backrest of the seat comprising:

a base member, means for supporting said base member in a plurality of vertical positions on said seat, a frame member covered by an outer cover for receiving and protecting a person's head, linkage means, pivotably connected to said base member and said frame member at fixed positions, for providing forward and rearward movement of said frame member relative to said base member along a substantially horizontal path, and means for imparting the forward and rearward movement of said frame member relative to said base member along said substantially horizontal path and for locking said frame member at selected positions relative to said base member, said imparting and locking means including:

a shaft rotatably connected to said frame member and extending through said outer cover, a cam member fixed to said shaft and having a cut out portion in its outer periphery, a pinion member, rotatably connected to said shaft, said pinion member having a tooth positioned within said cut out portion of said cam member and engageable with said cam member and further including a pinion gear, and a sector gear fixed on said base member and engaged with said pinion gear, whereby the rotation of said shaft and said cam member causes the pinion gear to move along the sector gear, thereby moving the frame member relative to the base member.

8. A device for forwardly and rearwardly adjusting the position of a headrest of a seat relative to the backrest of the seat comprising:

a base member supported on said backrest, a frame member covered by an outer cover for receiving and protecting a person's head, linkage means, pivotably connected to said base member and said frame member at fixed positions, for providing forward and rearward movement of said frame member relative to said base member along a substantially horizontal path, and means for locking said frame member at selected positions relative to said base member, said means including:

a shaft rotatably connected to said frame member and extending through said outer cover, a cam member fixed to said shaft and having a cut out portion in its outer periphery, a pinion member, rotatably connected to said shaft, said pinion member having a tooth positioned within said cut out portion of said cam member and engageable with said cam member and further including a pinion gear, and a sector gear fixed on said base member and engaged with said pinion gear, whereby the rotation of said shaft and said cam member causes the pinion gear to move along the sector gear, thereby moving the frame relative to the base member.

9. The device of claim 7 wherein said imparting and locking means further comprises a resilient member biased against the rotation of said cam member.

10. The device of claim 7 wherein said cam member and said pinion member are housed within a cylindrical casing fixed to said frame member and wherein said resilient member comprises a circular spring biased against the inner periphery of said casing and having its opposite ends bent to extend into said cut out portion between the walls of said cut out portion and the tooth of said pinion member.

* * * * *

UNITED STATES PATENT AND TRADEMARK OFFICE
CERTIFICATE OF CORRECTION

PATENT NO. : 4,304,439
DATED : Dec. 8, 1981
INVENTOR(S) : Takami Terada; Yasuhiro Kamijima It is certified that error appears in the above—identified patent and that said Letters Patent is hereby corrected as shown below:

Claim 5, line 6, change "or vertical positions" to --of vertical positions--.

Signed and Sealed this

Twentieth Day of April 1982

|SEAL|

Attest:

GERALD J. MOSSINGHOFF

Attesting Officer                Commissioner of Patents and Trademarks